United States Patent [19]
Boutaghou et al.

[11] Patent Number: 5,946,163
[45] Date of Patent: Aug. 31, 1999

[54] ACTUATOR ASSEMBLY FLEXIBLE CIRCUIT WITH REDUCED STIFFNESS

[75] Inventors: Zine-Eddine Boutaghou, Vadnais Heights; Richard Budde, Plymouth; Kevin Schultz, Apple Valley, all of Minn.

[73] Assignee: Seagate Technology, Inc., Scotts Valley, Calif.

[21] Appl. No.: 08/855,624

[22] Filed: May 13, 1997

Related U.S. Application Data

[62] Division of application No. 08/479,124, Jun. 7, 1995, abandoned.

[51] Int. Cl.⁶ ........................ G11B 5/48
[52] U.S. Cl. ........................ 360/104; 360/108
[58] Field of Search ........................ 360/104–106, 360/108

[56] References Cited

U.S. PATENT DOCUMENTS

| | | | |
|---|---|---|---|
| H1573 | 8/1996 | Budde | 360/104 |
| 3,535,780 | 10/1970 | Berger | 174/254 |
| 4,567,543 | 1/1986 | Miniet | 361/398 |
| 4,829,404 | 5/1989 | Jensen | 361/398 |
| 4,833,568 | 5/1989 | Berhold | 361/383 |
| 5,055,969 | 10/1991 | Putnam | 361/398 |
| 5,126,920 | 6/1992 | Cardashian et al. | 361/398 |
| 5,220,488 | 6/1993 | Denes | 361/398 |
| 5,392,179 | 2/1995 | Sendoda | 360/104 |
| 5,424,885 | 6/1995 | McKenzie et al. | 360/77.05 |
| 5,491,597 | 2/1996 | Bennin et al. | 360/104 |
| 5,584,120 | 12/1996 | Roberts | 29/846 |
| 5,594,607 | 1/1997 | Erpelding et al. | 360/104 |
| 5,598,307 | 1/1997 | Bennin | 360/104 |
| 5,631,786 | 5/1997 | Erpelding | 360/97.01 |
| 5,754,369 | 5/1998 | Balakrishnan | 360/104 |
| 5,774,305 | 6/1998 | Boutaghou | 360/104 |
| 5,812,342 | 9/1998 | Khan et al. | 360/104 |
| 5,844,752 | 12/1998 | Bozorgi et al. | 360/104 |

FOREIGN PATENT DOCUMENTS

6-124557  5/1994  Japan.

*Primary Examiner*—Jefferson Evans
*Attorney, Agent, or Firm*—Westman, Champlin & Kelly, P.A.

[57] ABSTRACT

A flex circuit comprises a flexible carrier and at least one conductor carried by the flexible carrier. The flexible carrier includes a lattice which provides reduced torsional and bending stiffness and reduced thermal expansion properties.

30 Claims, 5 Drawing Sheets

ACTUATOR ASSEMBLY FLEXIBLE CIRCUIT WITH REDUCED STIFFNESS

This is a divisional of application Ser. No. 08/479,124, filed Jun. 7, 1995 now abandoned.

BACKGROUND OF THE INVENTION

The present invention relates to an electrical flex circuit, and more particularly to a flex circuit comprising a lattice area with reduced bending and torsional stiffness and reduced thermal expansion properties.

Electrical flex circuits or cables are typically made of copper sheets deposited on a flexible carrier, such as a polymeric sheet. Portions of the copper sheet are masked with a desired pattern. The masked portions are etched to leave the desired pattern in the copper in the form of conductor traces. The pattern corresponds to a particular electrical circuit.

The stiffness of the polymeric sheet and of the copper determine the stiffness of the flex circuit. A desire to reduce or eliminate the torsional and bending stiffness of the flex circuit has led to a search for a super soft carrier or thin material to reduce the stiffness of the entire flex circuit. However, reducing the stiffness leads to a degradation of the flatness of the flex circuit. Also, the polymeric material used to construct the flex circuit is sensitive to temperature fluctuations. Temperature fluctuations can therefore cause undesirable thermal expansion and contraction in the flex circuit.

As a result, typical flex circuits have limited applicability in certain applications, such as in the electrical connections of a head gimbal assembly (HGA) of a disc drive data storage system. The head gimbal assembly is supported by an actuator assembly and includes a disc head slider and a gimbal. The slider carries a transducer for communicating with a recording surface in the storage system. The gimbal provides a resilient connection between the actuator assembly and the slider which allows the slider to pitch and roll while following the topography of the recording surface. The stiffness of traditional flex circuits have limited the applicability of flex circuits between the actuator assembly and the transducer since the stiffness interferes with the pitching and rolling of the slider and thereby adversely affects the flying characteristics of the slider.

SUMMARY OF THE INVENTION

A flex circuit according to the present invention comprises a flexible carrier having a lattice. At least one conductor is carried by the flexible carrier and extends along the lattice. The lattice provides reduced torsional and bending stiffness and reduced thermal expansion properties. The lattice also reduces an effective bond area between the conductor and the carrier yielding less interfacial stresses which improves the flatness of the carrier.

In one embodiment, the lattice is defined by a plurality of spaced apart apertures or depressions. The apertures preferably form a substantially random pattern and have a width that is equal to 0.5 to 1.5 times the width of the conductor. The apertures can have any shape, such as a circular or cross shape.

The flex circuit of the present invention is particularly useful in disc drive data storage systems for carrying conductors between an actuator assembly and a disc head slider. The lattice reduces the bending and torsional stiffness of the flex circuit in the area of the resilient connection between the actuator assembly and the slider such that the flex circuit does not adversely affect the flying characteristics of the slider. The flex circuit of the present invention also isolates the slider from thermal expansion and contraction of the flex circuit due to temperature fluctuations in the disc drive. As a result, the slider has a more consistent flying height with respect to a recording surface.

The flex circuit of the present invention is also useful in supporting electrical conductors between the actuator assembly and electrical circuits secured to the disc drive housing. With the reduced torsional and bending stiffness, the flex circuit of the present invention does not interfere with the actuator in positioning the slider over the recording surface.

DETAILED DESCRIPTION OF THE PREFERRED EMBODIMENTS

Figure 1:
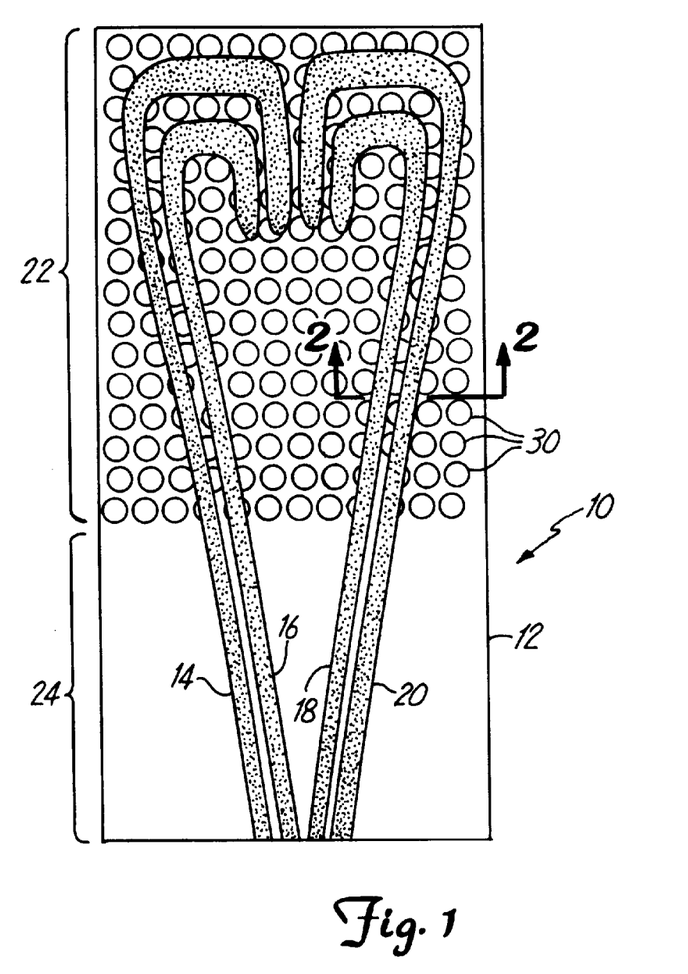
FIG. 1 is a top plan view of a flex circuit according to the present invention.
Figure 2:
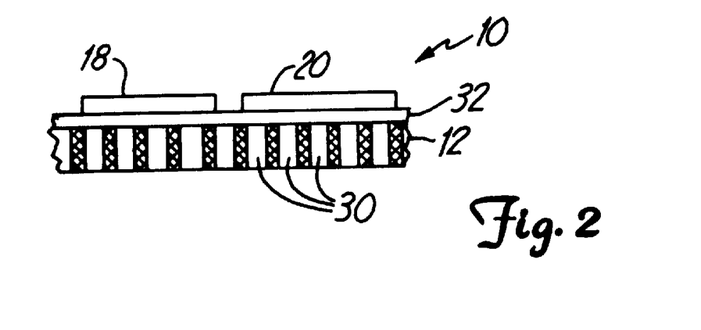
FIG. 2 is a fragmentary cross-sectional view of the flex circuit, taken along lines 2—2 of FIG. 1.

FIG. 1 is a top plan view of a flex circuit or flex cable 10 having reduced bending and torsional stiffness, according to the present invention. FIG. 2 is a fragmentary cross-sectional view of flex circuit 10, taken along lines 2—2 of FIG. 1. Flex circuit 10 includes a flexible carrier 12 and a plurality of copper conductor traces 14, 16, 18 and 20. Flex circuit 10 can have a single or multi-layered structure. Carrier 12 is formed of an electrically insulating polymeric material, such as polyimide Kapton plastic. "Kapton" is a trademark for a polyimide product manufactured by the E.I. DuPont de Nemours Company of Willmington, Del.

Carrier 12 includes a lattice area 22 having reduced bending and torsional stiffness and reduced thermal expansion relative to an area 24 of continuous carrier material. Lattice area 22 is defined by a plurality of apertures or depressions 30 through carrier 12. The width of each aperture 30 can vary from several microns to tenths of millimeters, depending on the desired flexural strength of the carrier. While apertures 30 can have virtually any size, the apertures preferably have a width that is about 0.5 to 1.5 times the width of conductors 14, 16, 18 and 20.

Apertures 30 can have any shape and are preferably randomly positioned with respect to one another within lattice area 22 so there are no preferred directions of bending. Also, there are preferably as many apertures or depressions per unit area as possible. In the embodiment shown in FIG. 1, apertures 30 have a circular cross section.

Apertures 30 can be laser ablated, punched, etched, pinched or otherwise perforated within carrier 12. Apertures 30 can be distributed throughout lattice area 22 as shown in FIG. 1 or can be restricted to areas other than the areas carrying conductors 14, 16, 18 and 20. Lattice area 22 can be confined to a particular portion of flex circuit 10 at which stresses occur or can extend along the entire flex circuit.

The flex circuit shown in FIGS. 1 and 2 can be constructed by perforating flexible carrier 12 and then depositing or bonding a copper sheet to carrier 12 through an adhesive 32, for example. Portions of the copper sheet are then masked with a desired pattern. The unmasked portions of the copper sheet are etched to leave the desired pattern in the copper sheet in the form of conductor traces 14, 16, 18 and 20, for example.

The conductors can be bonded to either side of carrier 12 or can be laminated within carrier 12. In one embodiment, the conductors are formed on carrier 12 prior to perforating the carrier. In this embodiment, the perforations are positioned around and between the conductors to prevent the perforation operation from damaging the conductors.

Figure 3:
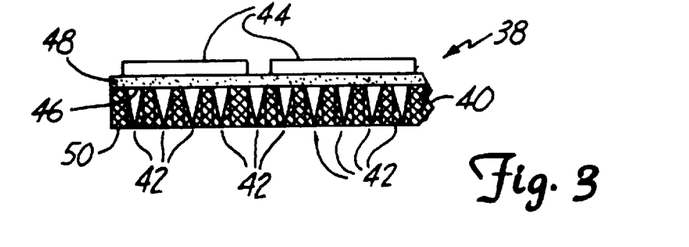
FIG. 3 is a fragmentary cross-sectional view of a flex circuit having apertures that have been pinched through without removal of material.

FIG. 3 is a fragmentary cross-sectional view of a flex circuit 38 having a flexible carrier 40 in which apertures 42 have been pinched through without removal of material. Conductors 44 are bonded to a surface 46 of carrier 40 with an adhesive 48. In an alternative embodiment, conductors 44 are attached to surface 50 of carrier 40.

Figure 4:
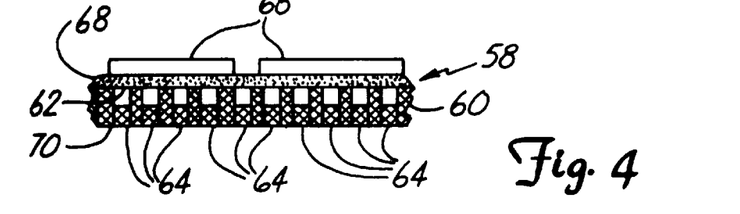
FIG. 4 is a fragmentary cross-sectional view of a flex circuit having a plurality of depressions.

FIG. 4 is a fragmentary cross-sectional view of yet another alternative embodiment of the present invention. Flex circuit 58 includes a carrier 60 having a surface 62 with a plurality of depressions 64. Depressions 64 are recessed from surface 62 but do not extend all the way through the carrier. Conductors 66 are attached to surface 64 through an adhesive 68, for example. In an alternative embodiment, conductors 66 are attached to opposing surface 70 of carrier 60.

Figure 5:
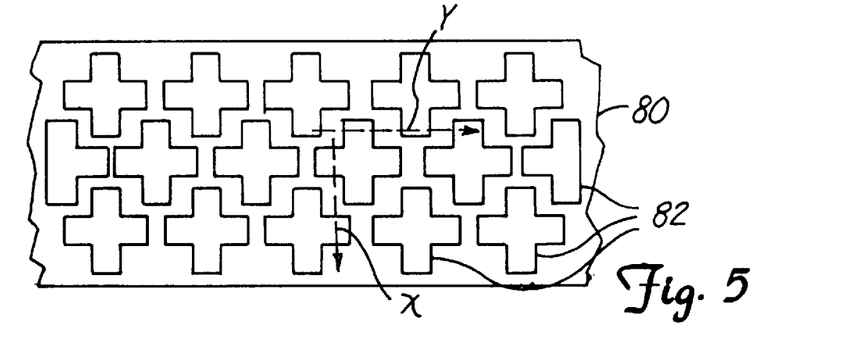
FIG. 5 is a fragmentary plan view of a flex circuit having cross-shaped apertures.

FIG. 5 illustrates a flexible carrier 80 in which apertures or depressions 82 have a cross shape, as opposed to a circular shape. Once again, the apertures or depressions 82 are preferably randomly positioned with respect to one another such that there is no preferred direction of bending. The cross shape allows the apertures or depressions 82 to be placed closer together than the circular shape shown in FIG. 1. As can be seen in FIG. 5, the cross-shaped apertures 82 overlap one another in a longintundal direction Y and in a width direction X.

The perforated flex circuit of the present invention has reduced torsional and bending stiffness and reduced thermal expansion. Also the apertures reduce the effective bond area between the conductors and the flexible carrier which yields less interfacial stresses and results in improved flatness in the flex circuit.

The stiffness of the flexible carrier and the conductors determine the stiffness of the flex circuit. The apertures in the lattice area cause the flexural strength of the lattice area to be dominated by the flexural strength of the conductors which can be deposited or laminated in a very thin layer. Since the displacement and rotation of a simple plate is proportional to the modulus of elasticity of the material and proportional to the thickness cubed and linearly proportional to the width and length of the plate, a very thin layer of copper is yields extremely low bending and torsional stiffness.

A series of finite element models was prepared according to the present invention. A square "cell" with a polyimide layer and a copper layer was used to represent a portion of the flex circuit. A smaller square portion was removed from the center of the polyimide layer of the cell to represent an aperture in the polyimide layer. The cell was copied and adjoined to create a flex circuit model one cell wide and two cells long.

The input and result of the finite element models were given in ratios of unit width and thickness. The width of the copper layer (conductor traces) was held constant at W. The size of the cell was held constant at 3W on each side. The pitch spacing of the copper traces and aperture were also 3W. The size of the aperture in the polyimide layer was varied from 0.5W from to 1.5W square. The thickness of the copper layer was held constant at a thickness of t, with t equal to W/10. The thickness of the adhesive was varied from 0.5t to 2.0t.

Three parameters were calculated, including cantilevered beam bending stiffness, torsional stiffness, and out of plane deflection due to thermal expansion. The bending and torsional stiffness results showed that it is much more effective to have a thin polyimide layer with no apertures than a thick polyimide layer with large apertures. The presence of large apertures has a significant and beneficial effect if the polyimide layer is thicker than the copper layer. Small holes have a very small effect in all thicknesses of polyimide.

The out-of-plane deflection due to thermal expansion results show that it is best to have a polyimide layer thinner than the copper layer. The presence of large holes therefore has a significant and beneficial effect regardless of the relative thickness of the polyimide layer. Small holes have a very small effect in all thicknesses of polyimide.

Another advantage of the present invention is that the apertures or depressions isolate thermal expansion in the flex circuit. Polymeric materials absorb humidity and thus exhibit out-of-plane deflection due to thermal expansion. With continuous material, the bulk of material follows the deflection load. However, with the addition of perforations, material stress caused by thermal expansion is localized and distributed around the perforations, thereby isolating deflection and expansion forces. The perforated flex circuit of the present invention is therefore less sensitive to temperature fluctuations than non-perforated flex circuits.

The perforated flex circuit also has a lower dielectric constant. In many applications, the conductors on the flex circuit carry high frequency signals in which the electrical charge travels around the side or surface of the conductor. Since the effective bond area between the conductor and the carrier is less, there is less interference between the charge and the carrier, resulting in a lower dielectric constant.

Figure 6:
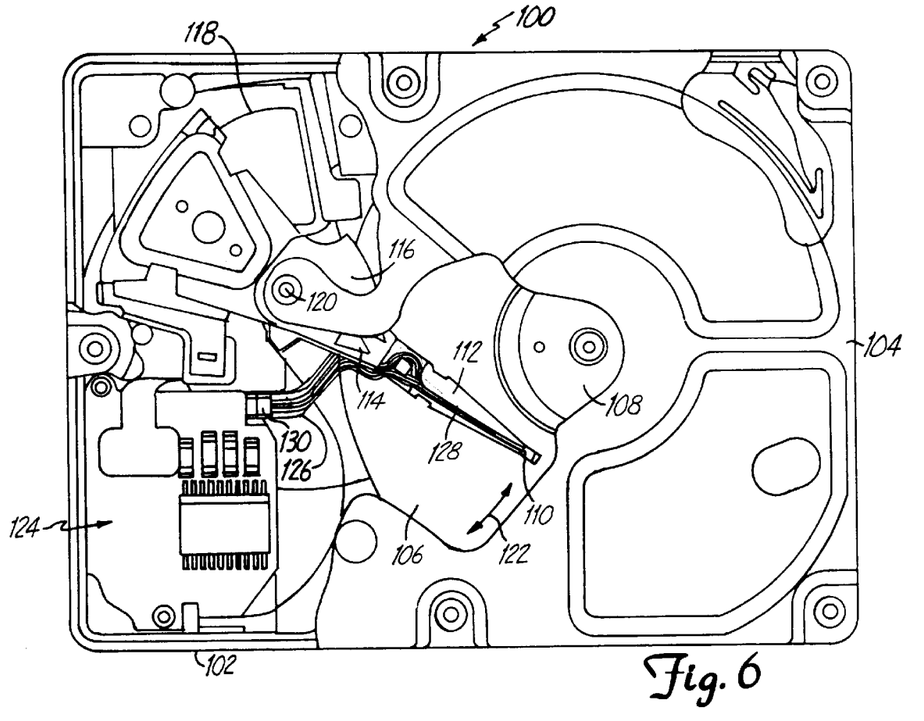
FIG. 6 is a top plan view of a disc drive data storage system in which the present invention is particularly useful.

FIG. 6 is a top plan view of a disc drive data storage system in which the present invention is particularly useful. Disc drive data storage system 100 includes a housing base 102 and a top cover 104. A disc 106 is mounted for rotation on a spindle motor (not shown) by a disc clamp 108. Disc 106 can include a plurality of individual discs which are mounted for co-rotation about a central axis. Each disc surface has an associated head gimbal assembly (HGA) 110 for communicating with an associated disc surface. HGA 110 is supported by a load beam flexure or suspension 112 which is in turn attached to a head mounting arm 114 of an actuator body 116.

The actuator shown in FIG. 6 is of the type known as a rotary moving coil actuator and includes a voice coil motor (VCM), shown generally at 118. Voice coil motor 118 rotates actuator body 116 about a pivot 120 to position HGA 110 over a desired data track along an arcuate path 122. Electronic circuitry 124 energizes voice coil motor 118 and communicates with HGA 110 to read and write information at desired locations on the disc surface. While a rotary actuator is shown in FIG. 6, the present invention is also useful in disc drives having other types of actuators, such as linear actuators.

Electrical connections between electronic circuitry 124, voice coil motor 118 and HGA 110 are carried by one or more flex circuits 126 in accordance with the present invention. Flex circuit 126 extends between connector 130 and head mounting arm 114. A flex circuit 128 routes selected conductors from flex circuit 126 to HGA 110. Flex circuit 128 can be connected directly to flex circuit 126 or can be connected through intermediate circuitry such as a preamplifier.

Figure 7:
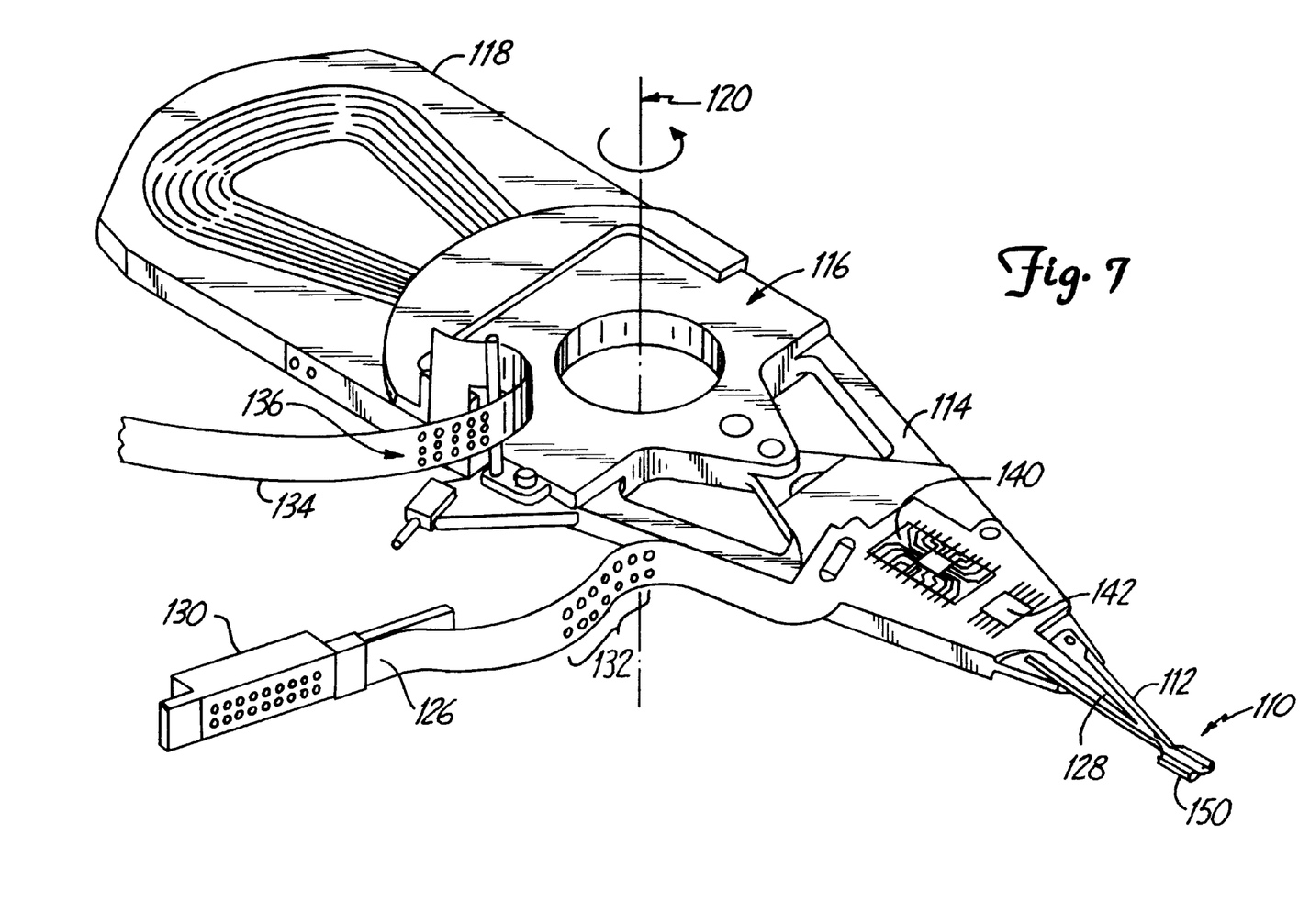
FIG. 7 is a perspective view of an actuator assembly shown in FIG. 6.

FIG. 7 is a perspective view of the actuator assembly shown in FIG. 6. Flex circuit 126 extends between connector 130 and preamplifiers 140 and 142 which are attached to head mounting arm 114. Connector 130 is coupled to electronic circuitry 124 which is attached to the housing. Flex circuit 126 includes a lattice area 132 in accordance with the present invention. Lattice area 132 can be confined to a particular area along flex circuit 126 or can extend over the entire flex circuit. Lattice area 132 allows the actuator assembly to pivot freely about pivot 120 without interfering with the positioning of HGA 110. An additional flex circuit 134 extends between voice coil motor 118 and electronic circuitry 124 and can include one or more lattice areas 136 according to the present invention.

HGA 110 includes air bearing disc head slider 150 which is resiliently attached to a load beam flexure 112. Slider 150 supports a transducer for communicating with the disc surface. The transducer is electrically coupled to preamplifiers 140 and 142 through flex circuit 128. Flex circuit 128 includes a lattice area according to the present invention such that the flex circuit does not interfere with the flying characteristics of slider 150.

Figure 8:
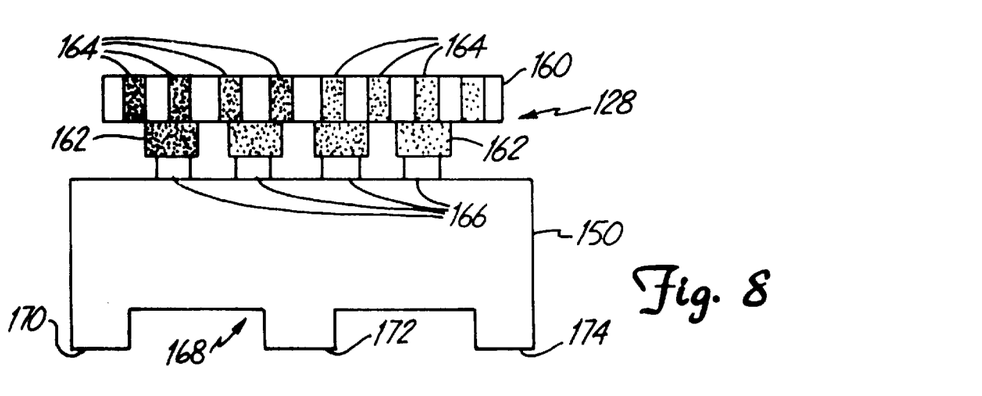
FIG. 8 is a cross-sectional view of a slider electrically coupled to a flex circuit according to the present invention.

FIG. 8 is a cross-sectional view of slider 150 which is electrically coupled to flex circuit 128. Flex circuit 128 includes a polyimide carrier 160 and a plurality of copper conductors 162. Polyimide carrier 160 has a plurality of apertures or depressions 164 according to the present invention. The copper conductors 162 are attached to corresponding bond areas 166 of slider 150. Slider 150 supports a transducer (not shown) along an air bearing surface 168, which communicates the disc surface.

As the disc rotates, the disc drags air beneath rails 170, 172 and 174 which developed positive pressure that causes the slider to lift and fly above the disc surface. Apertures or depressions 164 in polyimide carrier 160 prevent flex circuit 128 from interfering with the pitching and rolling of slider 150 as it follows the topography of the disc surface.

The desire to use flex circuits between the transducer and the actuator is based on the miniaturization of disc drive storage systems and a desire for greater automation. However, head gimbal assemblies are now being developed with sliders that are 50% and even 30% the size of traditional sliders. A 30% size slider has a length of only 49 mills and a width of only 39 mills. Sliders of this size require gimbals having very low pitch and roll stiffness. Existing flex circuits are therefore difficult if not impossible to use in such applications due to the thickness and stiffness of the flex circuit.

An additional limitation of existing flex circuits is the sensitivity of the polymeric material to temperature fluctuations. The sensitivity results in a change in the pitch static angle (PSA) and the roll status angle (RSA) of the slider with temperature. Changes in the PSA and RSA result in undesirable changes in fly height with temperature, especially for low flying sliders.

In contrast, the perforated flex circuit of the present invention has reduced torsional and bending stiffness and reduced thermal expansion characteristics. The perforated flex circuit yields extremely low static pitch and roll moments and is therefore particularly useful for making electrical connections to a transducer in a head gimbal assembly.

Figure 9:
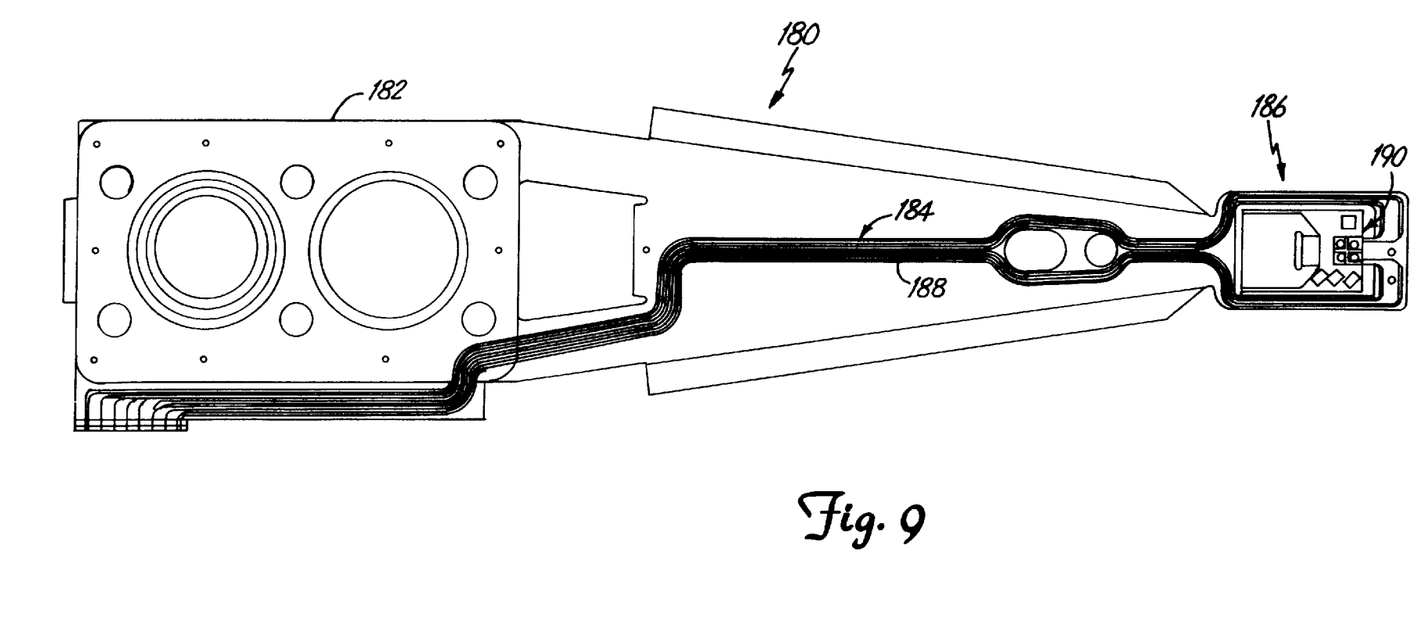
FIG. 9 is a top plan view of a flex circuit attached to an alternative load beam suspension, according to the present invention.

FIG. 9 is a top plan view of an alternative load beam flexure or suspension 180. Suspension 180 is attached to a base plate 182 and carries a flex circuit 184 according to the present invention. Flex circuit 184 extends from base plate 182 to a head gimbal assembly (HGA) 186. Flex circuit 184 supports a plurality of conductors 188 for communicating to and from HGA 186. Conductors 188 are coupled to a slider (not shown) at a bonding area 190. In one embodiment, flex circuit 184 includes a lattice area of apertures or depressions which is located along HGA 186. In another embodiment, the lattice area extends along the entire suspension 180.

Although the present invention has been described with reference to preferred embodiments, workers skilled in the art will recognize that changes may be made in form and detail without departing from the spirit and scope of the invention. For example, the perforated flex circuit of the present invention can be used in many applications. The apertures or depressions can have many shapes and sizes. Also, the particular connections between the flex circuit and various components of the disc drive are provided only as examples. Numerous other connections and configurations can be used in accordance with the present invention.

What is claimed is:

1. A disc drive data storage system, comprising:
   a housing;
   a spindle motor attached to the housing;
   at least one data storage disc attached to the spindle motor and having a recording surface;
   an actuator assembly attached to the housing;
   a disc head slider carried by the actuator assembly proximate to the recording surface and subject to repeated movement relative to the housing;
   a transducer carried by the disc head slider;
   a first electrical circuit attached to the housing; and
   a second electrical circuit coupled between the first electrical circuit and the transducer, the second electrical circuit comprising:
      a flexible carrier comprising a region subject to repeated bending deformation with the repeated movement of the disc head slider relative to the housing;
      at least one electrical conductor carried by the flexible carrier and extending through the region subject to repeated bending deformation; and
      a plurality of spaced apart apertures in the region subject to repeated bending deformation which reduce the effective area and effective stiffness of the flexible carrier in the region subject to repeated bending deformation.

2. The disc drive data storage system of claim 1 wherein the flexible carrier extends from the first electrical circuit to the actuator assembly and the region subject to repeated bending deformation is positioned between the first electrical circuit and the actuator assembly.

3. The disc drive data storage system of claim 1 wherein the flexible carrier extends from the actuator assembly to the transducer and the region subject to repeated bending deformation is positioned between the actuator assembly and the transducer.

4. The disc drive data storage system of claim 1 wherein the second electrical circuit further comprises a preamplifier which is carried by the actuator assembly and wherein the flexible carrier extends from the preamplifier to the disc head slider.

5. The disc drive data storage system of claim 1 wherein:
the actuator assembly comprises an actuator body, a head mounting arm extending from the actuator body, and a suspension extending from the head mounting arm and having a gimbal portion at a distal end thereof; and
the region subject to repeated bending deformation is positioned along the gimbal portion.

6. The disc drive data storage system of claim 1 wherein the flexible carrier has first and second surfaces and a thickness, and wherein the plurality of spaced apart apertures extend through the thickness from the first surface to the second surface.

7. The disc drive data storage system of claim 1 wherein the flexible carrier has first and second surfaces and a thickness, and the plurality of apertures extend from the first surface through a portion of the thickness and terminate prior to the second surface, thereby defining a plurality of spaced apart depressions.

8. The disc drive data storage system of claim 1 wherein the plurality of apertures are arranged in a substantially random pattern.

9. The disc drive data storage system of claim 1 wherein the plurality of apertures has a pattern and wherein the plurality of conductors has a pattern which is independent of the pattern of the plurality of apertures.

10. The disc drive data storage system of claim 1 wherein the plurality of apertures are arranged in a pattern that is selected such that the flexible carrier has substantially no preferred direction of bending within the region subject to repeated bending deformation.

11. A disc drive head suspension assembly comprising:
an elongated suspension comprising a base portion for attachment to an actuator assembly and a gimbal portion configured for repeated movement relative to the base portion; and
a flexible electrical circuit extending from the base portion to the gimbal portion and comprising an elongated flexible carrier having a region subject to repeated bending deformation with the repeated movement of the gimbal portion relative to the base portion, an elongated conductor carried by the flexible carrier and extending through the region subject to repeated bending deformation, and a plurality of spaced apart apertures in the region subject to repeated bending deformation to thereby reduce the effective area and effective stiffness of the flexible carrier in the region subject to repeated bending deformation.

12. The disc drive head suspension assembly of claim 11 wherein the plurality of spaced apart apertures forms a lattice which extends along the gimbal portion.

13. The disc drive head suspension assembly of claim 11 wherein the flexible carrier has first and second surfaces and a thickness, and wherein the plurality of spaced apart apertures extend through the thickness from the first surface to the second surface.

14. The disc drive head suspension assembly of claim 11 wherein the flexible carrier has first and second surfaces and a thickness, and the plurality of spaced apart apertures extend from the first surface through a portion of the thickness and terminate prior to the second surface, thereby defining a plurality of spaced apart depressions.

15. The disc drive head suspension assembly of claim 11 and further comprising a plurality of conductor extending through the region.

16. The disc drive head suspension assembly of claim 15 wherein the plurality of spaced apart apertures has a pattern and wherein the plurality of conductors has a pattern which is substantially independent of the pattern of the plurality of apertures.

17. The disc drive head suspension assembly of claim 11 wherein the plurality of spaced apart apertures arranged in a substantially random pattern.

18. The disc drive head suspension assembly of claim 11 wherein the plurality of apertures are arranged in a pattern that is selected such that the flexible electrical circuit has substantially no preferred direction of bending within the region.

19. The disc drive head suspension assembly of claim 11 wherein the number of apertures is maximized per unit area of the region.

20. The disc drive head suspension assembly of claim 11 wherein the plurality of apertures are arranged to minimize stiffness of the flexible electrical circuit within the region.

21. The disc drive head suspension assembly of claim 11 wherein the conductor has a width and the plurality of apertures each have a width that is 0.5 to 1.5 times the width of the conductor.

22. An actuator assembly comprising:
an actuator body;
a head mounting arm extending from the actuator body;
a suspension extending from the head mounting arm and having a distal end;
a slider carried at the distal end of the suspension and subject to repeated movement relative to the actuator body;
a preamplifier mounted to one of the actuator body and the head mounting arm;
a transducer carried by the slider; and
a flexible electrical circuit extending along the head mounting arm and the suspension and comprising a plurality of electrical conductors electrically coupled between the preamplifier and the transducer and a flexible carrier which carries the conductors and comprises an elongated flexible carrier having a region subject to repeated bending deformation with the repeated movement of the slider relative to the actuator body and a plurality of spaced apart apertures in the region subject to repeated bending deformation to thereby reduce the effective area and effective stiffness of the flexible carrier in the region subject to repeated bending deformation, wherein the plurality of electrical conductors extend through the region subject to repeated bending deformation.

23. The actuator assembly of claim 22 wherein the suspension comprises a gimbal portion located at the distal end and wherein the region subject to repeated bending deformation is positioned along the gimbal portion.

24. The actuator assembly of claim 22 wherein the flexible carrier has first and second surfaces and a thickness, and wherein the plurality of spaced apart apertures extend through the thickness from the first surface to the second surface.

25. The actuator assembly of claim 22 wherein the flexible carrier has first and second surfaces and a thickness, and the plurality of apertures extend from the first surface through a portion of the thickness and terminate prior to the second surface, thereby defining a plurality of spaced apart depressions.

26. The actuator assembly of claim 22 wherein the plurality of spaced apart apertures form a lattice.

27. The actuator assembly of claim 22 wherein the plurality of spaced apart apertures are arranged in a substantially random pattern.

28. The actuator assembly of claim 22 wherein the plurality of spaced apart apertures has a pattern and wherein the plurality of conductors has a pattern which is independent of the pattern of the plurality of spaced apart apertures.

29. The actuator assembly of claim 22 wherein the plurality of spaced apart apertures are arranged in a pattern that is selected such that the flexible electrical circuit has substantially no preferred direction of bending within the region.

30. A disc drive data storage system, comprising:

a housing;

a spindle motor attached to the housing;

at least one data storage disc attached to the spindle motor and having a recording surface;

an actuator assembly attached to the housing and configured to move repeatedly relative to the housing;

a disc head slider carried by the actuator assembly proximate to the recording surface;

a transducer carried by the disc head slider;

a first electrical circuit attached to the housing;

a second electrical circuit carried by the actuator assembly; and a flexible circuit extending between the housing and the actuator assembly and comprising an elongated flexible carrier having a region subject to repeated bending deformation with the repeated movement of the actuator assembly relative to the housing, an elongated conductor carried by the flexible carrier and extending through the region subject to repeated bending deformation, and a plurality of spaced apart apertures in the region subject to repeated bending deformation which reduce the effective area and effective stiffness of the flexible carrier in the region subject to repeated bending deformation.

* * * * *

UNITED STATES PATENT AND TRADEMARK OFFICE
CERTIFICATE OF CORRECTION

PATENT NO. : 5,946,163
DATED : August 31, 1999
INVENTOR(S) : Zine-Eddine Boutaghou et al.

It is certified that error appears in the above-identified patent and that said Letters Patent is hereby corrected as shown below:

Title page, Item

[75] Inventors: delete "Schultz" and insert --Schulz--.

Signed and Sealed this

Ninth Day of May, 2000

Attest:

Q. TODD DICKINSON

Attesting Officer      *Director of Patents and Trademarks*